US012798336B2

(12) United States Patent
Lee et al.

(10) Patent No.: US 12,798,336 B2
(45) Date of Patent: Nov. 17, 2026

(54) ROOF AIR CONDITIONER

(71) Applicants: HYUNDAI MOTOR COMPANY, Seoul (KR); KIA CORPORATION, Seoul (KR); DOOWON CLIMATE CONTROL CO., LTD, Asan-si (KR)

(72) Inventors: Sang Yeop Lee, Suwon-si (KR); Yeong Jae Jang, Seoul (KR); Ji Yun Ha, Suwon-si (KR); Dae Hee Lee, Incheon (KR); Jun Sic Jung, Anyang-si (KR); Won Seo Kang, Cheonan-si (KR)

(73) Assignees: HYUNDAI MOTOR COMPANY, Seoul (KR); KIA CORPORATION, Seoul (KR); DOOWON CLIMATE CONTROL CO.,LTD, Asan-si (KR)

( * ) Notice: Subject to any disclaimer, the term of this patent is extended or adjusted under 35 U.S.C. 154(b) by 293 days.

(21) Appl. No.: 18/805,037

(22) Filed: Aug. 14, 2024

(65) Prior Publication Data

US 2025/0222745 A1 Jul. 10, 2025

(30) Foreign Application Priority Data

Jan. 8, 2024 (KR) ........................ 10-2024-0002648

(51) Int. Cl.
*B60H 1/24* (2006.01)

(52) U.S. Cl.
CPC .................................... *B60H 1/245* (2013.01)

(58) Field of Classification Search
CPC ........................... B60H 1/245; B60H 1/00207; B60H 1/00521; B60H 1/00542; B60H 1/00592; B60H 1/00842; B60H 1/2225; B60H 2001/00235
See application file for complete search history.

(56) References Cited

FOREIGN PATENT DOCUMENTS

| | | | | | |
|---|---|---|---|---|---|
| KR | 20150099912 | A | * | 9/2015 | ......... B60H 1/00521 |
| KR | 20180096894 | A | * | 8/2018 | ......... B60H 1/00007 |
| KR | 20200125790 | A | * | 11/2020 | ......... B60H 1/00849 |
| KR | 20200127667 | A | * | 11/2020 | ......... B60H 1/00842 |
| KR | 102401276 | B1 | * | 5/2022 | ........... B60H 1/3407 |
| KR | 102456836 | B1 | * | 10/2022 | ......... B60H 1/00207 |
| KR | 20230021911 | A | * | 2/2023 | ........... B60H 1/3204 |
| KR | 20230026782 | A | * | 2/2023 | ........... B60H 1/3229 |

* cited by examiner

*Primary Examiner* — Emmanuel E Duke

(74) *Attorney, Agent, or Firm* — Lempia Summerfield Katz LLC

(57) ABSTRACT

A roof air conditioner includes a blower configured to allow air to be introduced into a housing, a first flow path configured to allow the air in the housing to be discharged through a first discharge port, an evaporator located in at least a part of the first flow path, a second flow path configured to allow the air in the housing to be discharged through a second discharge port, and a switching door configured to open and close the first discharge port and the second flow path. The first flow path includes a cooling flow path discharging the air through the first discharge port via the evaporator, a bypass flow path discharging the air through the first discharge port without passing through the evaporator, and a temp door controlling an opening amount of the cooling flow path and an opening amount of the bypass flow path.

11 Claims, 4 Drawing Sheets

[ DEFROST MODE ]

[ DEFROST MODE ]

ROOF AIR CONDITIONER

CROSS-REFERENCE TO RELATED APPLICATION

This application claims, under 35 U.S.C. § 119(a), the benefit of and priority to Korean Patent Application No. 10-2024-0002648, filed on Jan. 8, 2024, the entire contents of which are incorporated herein by reference.

BACKGROUND

(a) Technical Field

The present disclosure relates to a roof air conditioner. More particularly, the present disclosure relates to a roof air conditioner installed in a vehicle roof and configured to selectively discharge conditioned air.

(b) Background Art

A vehicle air conditioner provided as a part of a vehicle is configured to cool or heat the vehicle interior in summer or winter and/or is configured to remove frost from the windshield in rainy weather or winter, thereby making it possible to secure a driver's front and rear view. The air conditioner is generally provided with a heating system and a cooling system and selectively introduces, i.e., takes in, outside air or inside air. Thereafter, this introduced air is heated or cooled and is blown into the vehicle interior, thereby cooling, heating, or ventilating the vehicle interior.

A general vehicle air conditioner is typically a front air conditioner, and air for cooling or heating is configured to be discharged from a discharge port formed in an instrument panel at the front end of the vehicle interior. In the case of vehicles having a large interior space, such as luxury cars or SUVs, an existing air conditioner may not provide sufficient air for cooling or heating to the rear seats.

In order to solve the above-described problem, in the case of a vehicle having a large interior space, a rear seat air conditioner or a roof type air conditioner, installed on a vehicle roof may be used. The roof type air conditioner is configured to discharge air-conditioned air over the heads of the vehicle occupants and is installed separately, thereby assisting cooling and heating performance for the rear seats.

In a conventional design related to a roof type air conditioner for a vehicle, the roof type air conditioner includes a plurality of air passages provided in a part of a space in a case or housing that is installed on a vehicle roof. Each of the air passages can include a condenser, an evaporator, and a fan. The roof type air conditioner also includes a refrigerant circulation system provided in a separate space in the case or housing and configured to circulate refrigerant using the condenser and the evaporator.

Further, another air passage is configured to cool air introduced from the inside of the vehicle through the evaporator by forced air blown from a cross flow fan and to perform a cooling function and an air-conditioning function by discharging the air through or from the vehicle roof.

When the roof type air conditioner is installed on the vehicle roof, the size of the roof increases. This may not only directly affect interior and exterior appearance of a vehicle but may also affect driving performance of a vehicle.

The roof type air conditioner of the related art has a cross flow type fan applied thereto. The length of the roof type air conditioner thus increases in the upward-and-downward direction, which makes it difficult to install the roof type air conditioner in the vehicle roof. Here, even if the roof type air conditioner is installed outside the roof, the height of a vehicle increases. Accordingly, the roof type air conditioner is installable in large buses, but it may be difficult to install the roof type air conditioner in passenger cars and vans.

Further, since the roof type air conditioner is configured to discharge only cooled and heated air into the vehicle interior, it is difficult to provide an additional discharge port adopted to perform dehumidification of the front and rear window glass of the vehicle.

The above information disclosed in this Background section is only to enhance understanding of the background of the disclosure. Therefore, the Background section may contain information that does not form the prior art that is already known to a person of ordinary skill in the art.

SUMMARY OF THE DISCLOSURE

The present disclosure has been made in an effort to solve the above-described problems associated with the prior art. It is an object of the present disclosure to provide a roof air conditioner configured to selectively discharge, through a first discharge port and a second discharge port, air introduced into a housing including a first flow path and a second flow path.

Further, it is an object of the present disclosure to provide a roof air conditioner configured to provide a blind located in the first flow path and to control air to be discharged, depending on a set temperature, through a cooling flow path and a bypass flow path.

The objects of the present disclosure are not limited to the above-mentioned objects. Other technical objects not mentioned herein should be more clearly understood by those of ordinary skill in the art to which the present disclosure pertains from the detailed description of the embodiments. Additionally, the objects of the present disclosure may be achieved by the features and combinations thereof as indicated in the claims.

In one aspect, the present disclosure provides a roof air conditioner including a blower configured to introduce air into a housing. The roof air conditioner also includes a first flow path configured to allow the air introduced into the housing to be discharged through a first discharge port, an evaporator located in at least a part of the first flow path, and a second flow path configured to allow the air introduced into the housing to be discharged through a second discharge port branching from the first flow path. The roof air conditioner also includes a switching door configured to open and close the first discharge port and the second flow path. The first flow path includes a cooling flow path configured to allow the air to be discharged through the first discharge port via the evaporator, a bypass flow path configured to allow the air to be discharged through the first discharge port without passing through the evaporator, and a temp door configured to control an opening amount of the cooling flow path and an opening amount of the bypass flow path.

In an embodiment, the switching door may be controlled to close the second flow path in an open state of the first discharge port.

In another embodiment, the switching door may be controlled to open the second flow path in a closed state of the first discharge port.

In still another embodiment, the roof air conditioner may further include a heating wire part located in the bypass flow path.

In yet another embodiment, the temp door may be controlled to open the bypass flow path when the cooling flow path is closed.

In still yet another embodiment, the temp door may be controlled to close the bypass flow path when the cooling flow path is opened.

In a further embodiment, the roof air conditioner may further include a blind located in the first flow path and configured to penetrate the evaporator so as to partition or branch the cooling flow path.

In another further embodiment, the blind may be located across the evaporator so as to partition the cooling flow path into a first sub-flow path and a second sub-flow path.

In still another further embodiment, the temp door may include a first temp door and a second temp door with the blind centrally located therebetween. The first temp door may control the first sub-flow path and the bypass flow path adjacent to the first sub-flow path. The second temp door may control the second sub-flow path and the bypass flow path adjacent to the second sub-flow path. An opening amount of the first temp door and an opening amount of the second temp door may be independently controlled.

In yet another further embodiment, the switching door may include switching doors that may be respectively located in the first and second discharge ports partitioned by the blind.

In still yet another further embodiment, the first discharge port may be located corresponding to a passenger compartment of a vehicle and the second discharge port may be located adjacent to glass of the vehicle.

Other aspects and embodiments of the disclosure are discussed herein.

It should be understood that the terms "vehicle", "vehicular", and other similar terms as used herein are inclusive of motor vehicles in general. Such motor vehicles may encompass passenger automobiles including sport utility vehicles (SUV), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of the disclosure are discussed herein.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

Figure 1:
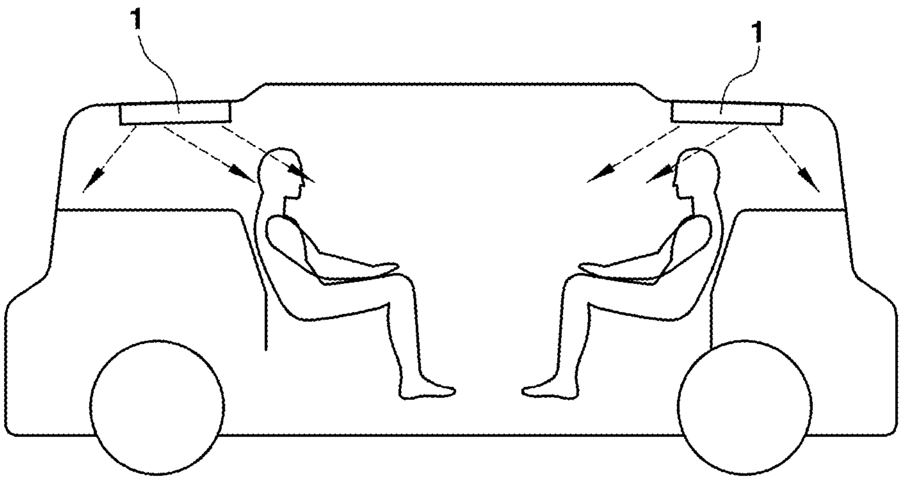
FIG. 1 is a side view of a vehicle including roof air conditioners respectively provided at the front end and the rear end of a passenger compartment of a vehicle according to an embodiment of the present disclosure.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

DETAILED DESCRIPTION

Hereinafter, reference is made in detail to various embodiments of the present disclosure, examples of which are illustrated in the accompanying drawings and described below. While the technical concepts of the disclosure are described in conjunction with certain embodiments, it should be understood that the present description is not intended to limit the scope of the disclosure to the embodiments. On the contrary, the disclosure is intended to cover not only the embodiments described herein, but also various alternatives, modifications, equivalents, and other embodiments, which may be included within the spirit and scope of the disclosure as defined by the appended claims. The present embodiments are provided to more fully explain the disclosure to those of ordinary knowledge in the art.

Terms such as "part", "unit", and "module" described in the specification mean a unit configured to process at least one function or operation. The unit may be implemented by hardware or software or a combination of hardware and software. When a component, device, element, or the like of the present disclosure is described as having a purpose or performing an operation, function, or the like, the component, device, or element should be considered herein as being "configured to" meet that purpose or perform that operation or function.

The terms used in the present application are used only to describe specific embodiments and are not intended to limit the present disclosure. Singular forms are intended to include plural forms as well, unless the context clearly indicates otherwise.

Meanwhile, in the present specification, terms such as "first", "second", "sub", "temp", and "bypass" may be used to describe various components, but the components are not limited by the terms. The terms are used only for the purpose of distinguishing one component from other components. The components are not limited by the terms in the following description.

Additionally, various embodiments disclosed in the present specification may be implemented by software (for example, a program) including an instruction stored in a storage medium that is readable by a machine (for example, a computer). The machine is a device capable of calling an instruction stored in the storage medium and being operable in response to the called instruction. The machine may include an electronic device (for example, a server) according to the disclosed embodiments. The instructions may include code provided or executed by a compiler or an interpreter. A machine-readable storage medium may be provided in the form of a non-transitory storage medium. Here, "non-transitory" merely means that the storage medium does not include a signal and is tangible and does not distinguish whether data is stored semi-permanently or temporarily in the storage medium.

Additionally, in this specification, a door is controlled by a motor or a driving device. Although not described herein, a controller located in a vehicle may receive a request from a user and power is controlled to be applied to the motor or the driving device in response to the request.

Hereinafter, embodiments are described in detail with reference to the accompanying drawings. In describing the embodiments with reference to the accompanying drawings, the same or corresponding components are denoted by the same reference numerals throughout the description and drawings and overlapping descriptions thereof have been omitted.

Figure 2:
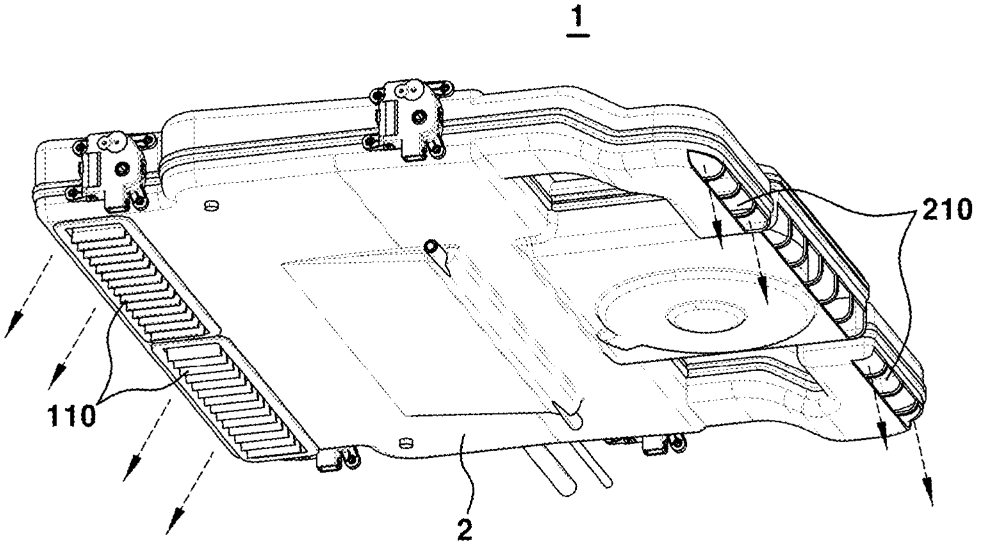
FIG. 2 is a diagram showing a configuration of a roof air conditioner according to an embodiment of the present disclosure.
Figure 3:
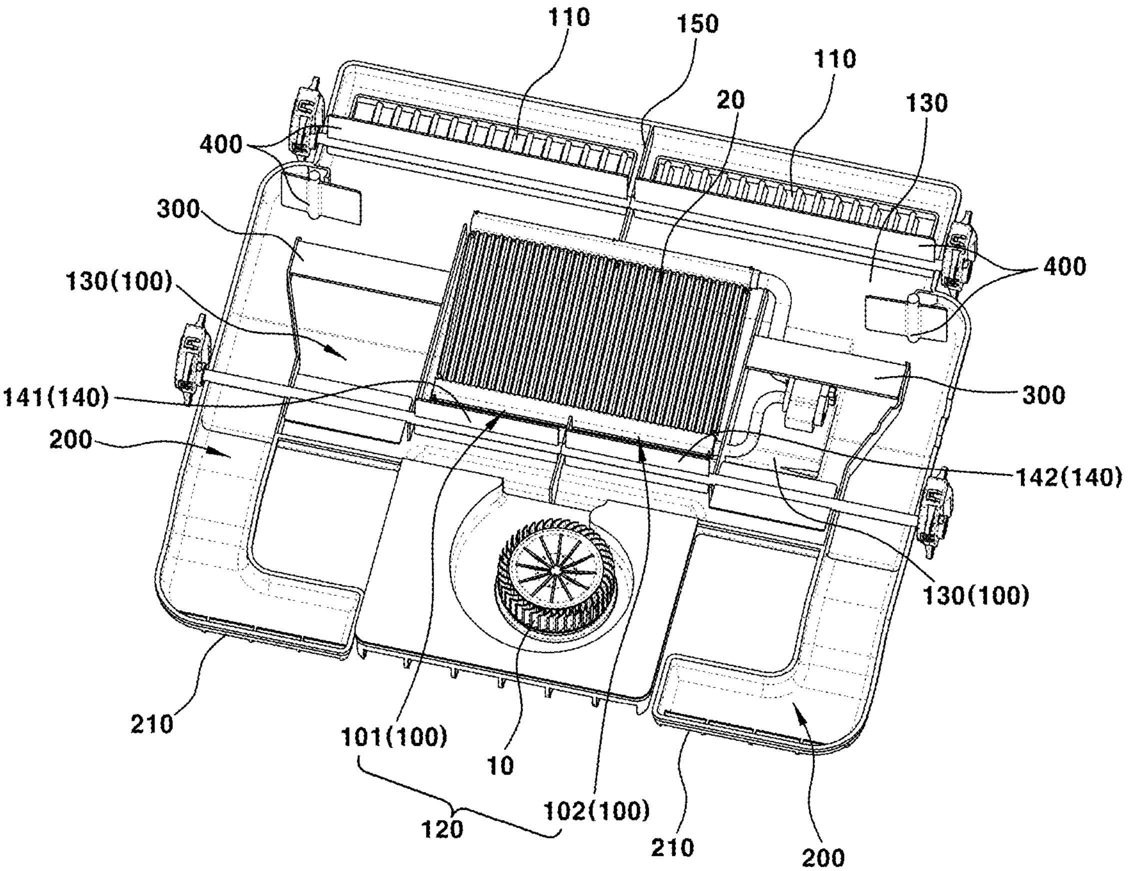
FIG. 3 is a diagram showing a configuration of each of a first flow path and a second flow path of a roof air conditioner according to an embodiment of the present disclosure.

FIG. 1 is a diagram showing roof air conditioners 1 respectively located at or near the front end of a vehicle passenger compartment and the rear end thereof according to an embodiment of the present disclosure. FIG. 2 is a diagram showing configurations of a first discharge port 110 and a second discharge port 210 of the roof air conditioner 1. Additionally, FIG. 3 is a diagram showing a positional relationship of the components of the roof air conditioner 1.

The roof air conditioner 1 of the present disclosure is inserted into a roof of a vehicle in a state of being located adjacent to the front windshield or rear windshield, i.e., glass of the vehicle. The roof air conditioner 1 is configured to include a plurality of flow paths formed in a housing 2. At least one flow path may also be configured to include a plurality of sub-flow paths.

The first discharge port 110 is fluidly connected to a first flow path 100 and is located at one end of the roof air conditioner 1. The second discharge port 210 is fluidly connected to a second flow path 200 and is located at the other end of the roof air conditioner 1. In this example, the roof air conditioner 1 has two such first discharge ports 110 and two such second discharge ports 210 and the roof air conditioner may have more or less than the two of each. Moreover, cooled air or heated air in the housing 2 is configured to be discharged to a vehicle passenger compartment through the first discharge port 110 and directed toward the passengers or seats. Cooled air or heated air in the housing 2 is also configured to be discharged to the inner side of the glass through the second discharge port 210. The first discharge port 110 has flaps, i.e., wings (not shown) provided therein. One of the wings (left wing) is located on the left side of a partition, partition wall, blind, or the like, i.e., a blind 150 located in the housing 2 and the other one of the wings (right wing) is located on the right side of the blind 150. In one example, the left wing and the right wing are independently controllable, and temperature of air discharged, as well as the discharge direction, from the left side of one discharge port and temperature of air discharged, as well as the discharge direction, from the right side thereof may be set independently of each other.

In addition, the roof air conditioner 1 includes a blower 10 located at one end of the housing 2. The housing 2 and the blower 10 are configured to allow air in the vehicle compartment or air supplied from the outside to be introduced thereinto. The blower 10 is located in the vertical direction of the housing 2 in this example and is configured to have a fan shape. Further, according to an embodiment of the present disclosure, the blower 10 may include a fan such as a sirocco fan arranged such that air outside the housing 2 is suctioned in the vertical direction into the housing 2. The suctioned air is configured to be discharged through the first flow path 100 and/or the second flow path 200 in the housing 2.

In the housing 2, an evaporator 20 is located in at least a part of the first flow path 100. When air supplied from the blower 10 flows through or along the first flow path 100, at least a part of the air is configured to flow through the evaporator 20. In addition, the roof air conditioner 1 includes the blind 150 located in the first flow path 100 and configured to partition a cooling flow path 120 of the first flow path 100 into two sub-flow paths 101 and 102. The blind 150 is formed to be integrated with the housing 2 and is located in a state of passing through the evaporator 20. Accordingly, air introduced into each of the sub-flow paths 101, 102 is configured to pass through at least a part of the evaporator 20.

In other words, the first flow path 100 includes the cooling flow path 120 configured to allow air to be discharged therethrough via the evaporator 20 and includes a bypass flow path 130 configured to allow air to be discharged therethrough while bypassing the evaporator 20. Moreover, the cooling flow path 120 includes the first sub-flow path 101 and the second sub-flow path 102 each obtained by partitioning the cooling flow path 120 into two sub-flow paths using the blind 150. Specifically, the blind 150 partitions the cooling flow path 120 into the left side and the right side.

In this manner, the first flow path 100 of the present disclosure includes the cooling flow path 120 passing through the evaporator 20 and the bypass flow path 130 bypassing the evaporator 20. The cooling flow path 120 includes the first sub-flow path 101 and the second sub-flow path 102 each obtained by partitioning the cooling flow path 120 into the two sub-flow paths using the blind 150.

A temp door 140 is rotatably located in the housing 2 between the first flow path 100 and the blower 10. Additionally, the temp door 140 is configured to simultaneously control opening and closing of the cooling flow path 120 and the bypass flow path 130. The temp door 140 is located and configured so that opening and closing of the cooling flow path 120 and opening and closing of the bypass flow path 130 may be different from each other. In other words, the temp door 140 may be configured to respectively control an opening amount of the cooling flow path 120 and an opening amount of the bypass flow path 130.

In an embodiment of the present disclosure, the temp door or doors 140 on the left side of the blind 150 and the temp door or doors 140 on the right side thereof may be independently controlled. Each of the temp doors 140 includes a flap configured to have, i.e., be positioned at different angles relative to a central shaft configured to penetrate the housing 2. Moreover, a flap corresponding to the respective sub-flow path 101 or 102 and a flap corresponding to the corresponding bypass flow path 130 located adjacent to the sub-flow path are configured to form an angle of 90 degrees therebetween. Accordingly, when the sub-flow path 101 or 102 is opened, the corresponding bypass flow path 130 may be closed and when the bypass flow path 130 is opened, the respective sub-flow path 101 or 102 may be switched to a closed state. Furthermore, the central shaft carrying the flaps may be rotated so as to open both the sub-flow path 101 or 102 and the corresponding bypass flow path 130. This makes it possible to adjust an opening amount of the temp door 140.

In an embodiment of the present disclosure, the temp door 140 may include a first temp door 141 and a second temp door 142 with the blind 150 being centrally located therebetween. In other words, one temp door 141 or 142 may integrally control opening and closing of the respective sub-flow path 101 or 102 and the bypass flow path 130 adjacent to the sub-flow path. In an embodiment of the present disclosure, one temp door 140 is located on each of the left side (temp door 141) of the blind 150 and the right side (temp door 142) thereof.

In this manner, via the first temp door 141, when the first sub-flow path 101 is fully opened, the bypass flow path 130 located adjacent to the first sub-flow path 101 is maintained in a completely closed state. In addition, via the second temp door 142, when the second sub-flow path 102 is fully opened, the bypass flow path 130 located adjacent to the second sub-flow path 102 is switched to a completely closed state.

A switching door 400 is located at a branch location of the first flow path 100 and the second flow path 200 and a switching door 400 is located adjacent to the first discharge port 110 so as to control opening and closing of the second flow path 200 and opening and closing of the first discharge port 110. The switching doors 400 may be controlled to open the first discharge port 110 and to close the second flow path 200 when cooling or heating of the vehicle passenger compartment is required. Additionally, when dehumidification of the glass is performed, the switching doors 400 may be controlled to open the second flow path 200 and to close the first discharge port 110.

The switching door 400 located between the first flow path 100 and the second flow path 200 and the switching door 400 located at the inner end of the first discharge port 110 may each be integrally controlled. Further, the switching door 400 located at the inner end of the first discharge port 110 may be divided into a left switching door 400 and a right switching door 400 with the blind 150 being centrally located therebetween. The left switching door 400 and the right switching door 400 may be controlled independently in response to temperature settings in the vehicle passenger compartment. Further, The switching door 400 located between the first flow path 100 and the second flow path 200 may include a switching door 400 on each side of the housing 2, as there are first and second flow paths 100, 200 on each side of the roof air conditioner 1 in the embodiment shown.

The roof air conditioner 1 includes the second flow paths 200 formed to branch from the first flow path or paths 100, respectively located on the opposite sides of the first flow path or paths 100, and configured to perform defrosting. The switching doors 400, respectively located on the opposite sides of the housing 2 and respectively disposed at locations where the first flow path 100 and the second flow path 200 diverge, are opened and closed integrally. Each of the switching doors 400 provided at the location where the first flow path 100 and the second flow path 200 diverge may be formed of a flap that is rotated around a central shaft in the height direction of the housing 2. Accordingly, in response to input of a defrost mode by a user, the second flow paths 200 may be switched to an open state by the switching doors 400 being rotated around the central shaft. Through this configuration, air introduced from the blower 10 may be discharged to the second discharge port 210 through the second flow path 200 and may be directed to flow along one side, i.e., the vehicle interior side of the glass.

In addition, the switching door 400, located at the first discharge port 110 and partitioned by the blind 150, is divided into the left switching door 400 and the right switching door 400. The left switching door 400 and the right switching door 400 may be opened and closed independently in response to a request from a user.

In this way, the switching doors 400 are respectively located at a front end of the second flow path or paths 200 and an inner side portion of the first discharge port 110, and each of the switching doors 400 may be controlled to be opened and closed independently.

Figure 4:
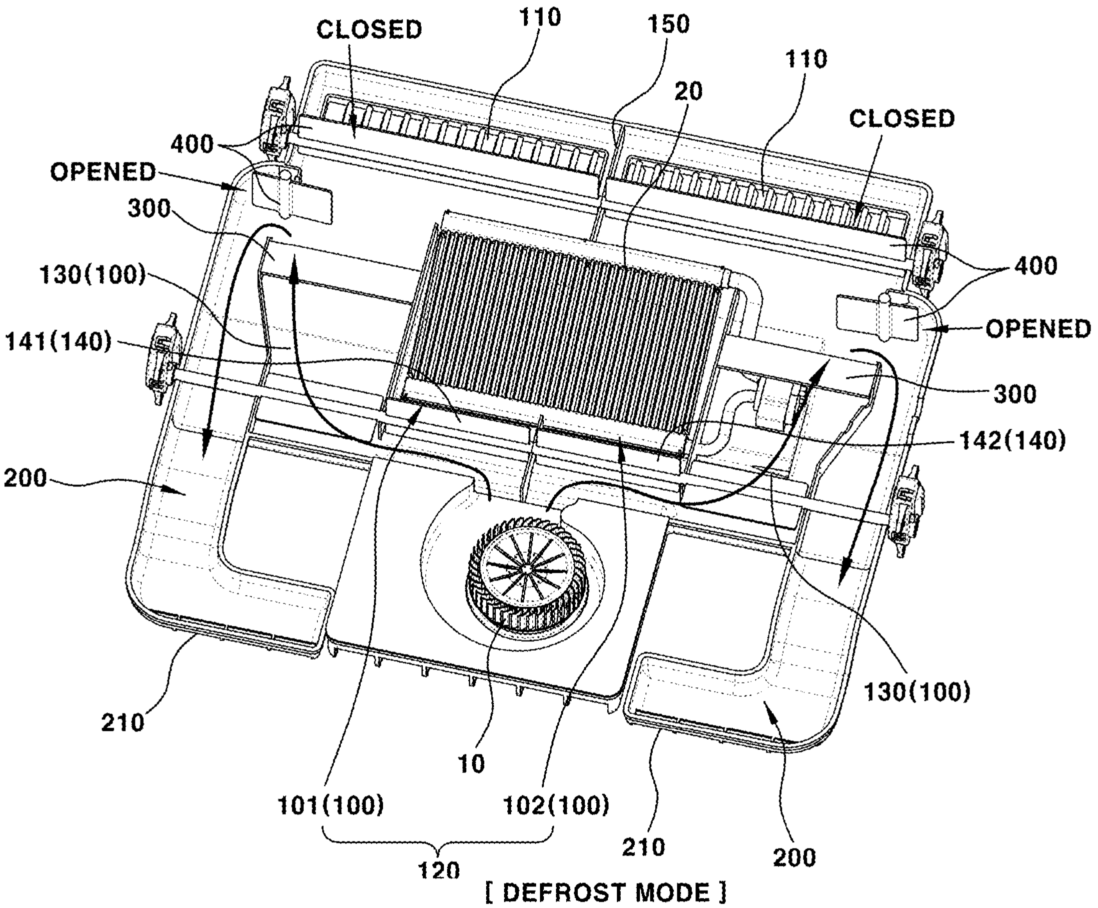
FIG. 4 is a diagram showing a structure in which glass dehumidification is performed through a second discharge port of a roof air conditioner according to an embodiment of the present disclosure.

FIG. 4 is a diagram showing, as the embodiment of the present disclosure, a relationship between configurations in which air in the housing 2 is discharged through the second discharge port or ports 210 when a defrost mode is input, i.e., selected by a user.

Air flowing through the blower 10 is moved in the housing 2 through the first flow path 100. Moreover, the switching door 400, located at a branch of the first flow path 100 and configured to open and close the second flow path 200, is switched to the open state. Here, the switching door 400 formed in the first discharge port 110 may be opened or closed in response to a request from a user.

Air introduced into the first flow path 100 is moved through the cooling flow path 120 or the bypass flow path 130 in response to user's setting or defrost temperature. In the embodiment of the present disclosure, mixed air is formed through the cooling flow path 120 and the bypass flow path 130 in response to temperature in the defrost mode, and the switching door or doors 400 are switched to a fully open state so that the mixed air is introduced into the second flow path or paths 200. Air having a set temperature in the housing 2 is discharged to the inner surface of the vehicle glass through the second discharge port or ports 210 by using the opened switching door or doors 400. Furthermore, an amount of air passing through the cooling flow path 120 may be adjusted by controlling the first temp door 141 and the second temp door 142 depending on the set temperature in the defrost mode.

Furthermore, in the defrost mode, each switching door 400 is rotated so as to fully open the respective second flow path 200 and is controlled to discharge the maximum discharge amount through the corresponding second discharge port 210.

Figure 5:
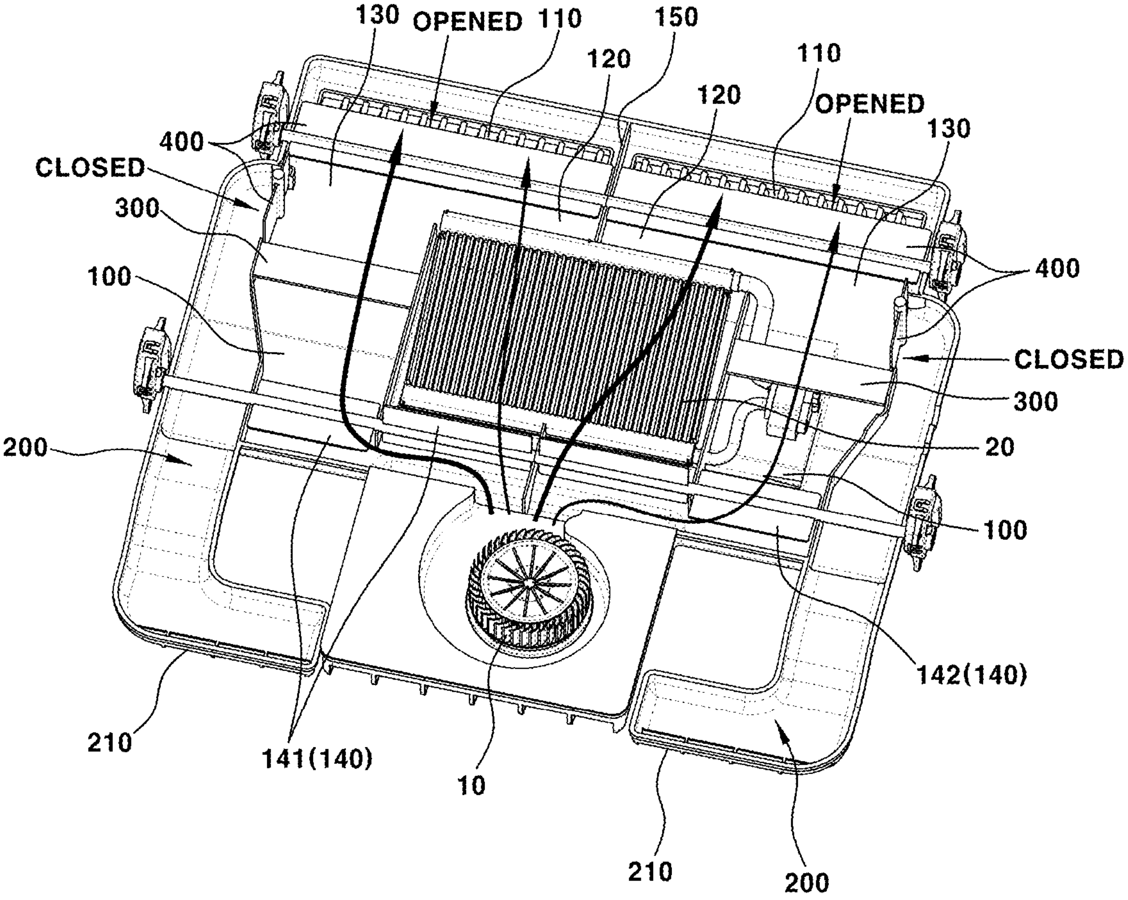
FIG. 5 is a diagram showing a structure in which mixed air is discharged into a passenger compartment of a vehicle through a cooling flow path and a bypass flow path of a roof air conditioner according to an embodiment of the present disclosure.

According to the embodiment of the present disclosure, FIG. 5 is a diagram showing a flow of mixed air having different temperatures, in which the mixed air is discharged to the first discharge ports 110 respectively located on the left side and the right side of the blind 150.

In the shown area, a discharge temperature of the first discharge port 110 located on the left side of the blind 150 and a discharge temperature of the second discharge port 110 located on the right side of the blind 150 are set to be different from each other. Here, the temperature of air discharged through the first discharge port 110 located on the right side of the blind 150 is configured to be low.

Accordingly, the temperature door 140, i.e., the first temp door 141 and the second temp door 142, is controlled so that an amount of air introduced into the first sub-flow path 101 disposed on the left side of the blind 150 is smaller than an amount of air introduced into the second sub-flow path 102 disposed on the right side of the blind 150.

Here, the temp door 140 is adjacent to the blower 10 and is located between the first flow path 100 and the blower 10. Moreover, the temp door 140 facing the first discharge port 110 includes the first temp door 141 that integrally controls an opening amount of the first sub-flow path 101 located on the left side of the blind 150 and an opening amount of the bypass flow path 130 located adjacent to the first sub-flow path 101 and includes the second temp door 142 that integrally controls an opening amount of the second sub-flow path 102 located on the right side of the blind 150 and an opening amount of the bypass flow path 130 located adjacent to the second sub-flow path 102.

The first temp door 141 is configured to control an amount of air introduced into the first sub-flow path 101 from the blower 10 and an amount of air introduced into the bypass flow path 130 adjacent to the first sub-flow path 101. Therefore, when temperature of air discharged from the left side of the housing is relatively low, the first temp door 141 is controlled so that a flow rate of air introduced into the first sub-flow path 101 becomes small and a flow rate of air introduced into the bypass flow path 130 becomes large.

Additionally, the bypass flow path 130 may be configured to include a heating wire part 300. More specifically, the heating wire part 300 may be configured as a PTC heater. Accordingly, power may be applied to the heating wire part 300 located in one of the bypass flow paths 130 on the left and right sides, in which the one bypass flow path 130 has a high set temperature.

Conversely, a description is given as to a flow of air on the right side of the housing 2 where a discharge temperature is set to be low. An amount of air introduced from the blower 10 into the second sub-flow path 102 passing through the evaporator 20 is controlled so as to exceed an amount of air flowing through the bypass flow path 130.

In other words, the second temp door 142 is configured to integrally control an amount of air introduced into the second sub-flow path 102 from the blower 10 and an amount of air introduced into the bypass flow path 130 adjacent to the second sub-flow path 102. Accordingly, the second temp door 142 is controlled so that the amount of air introduced into the second sub-flow path 102 is greater than the amount of air introduced to the bypass flow path 130 adjacent to the second sub-flow path 102.

Accordingly, the temperature of air discharged from the first discharge port 110 on the right side of the blind 150 may be lower than the temperature of air discharged from the first discharge port 110 on the left side of the blind 150.

As should be apparent from the above description, the present disclosure may achieve the following effects through the embodiments, a combination of the above-described configurations, and a use relationship therebetween.

The present disclosure has an effect of providing a roof air conditioner having a discharge temperature set in response to a request from a user.

In addition, the present disclosure provides different air conditioners, respectively disposed at the opposite ends of the roof air conditioner, inserted into a roof of the vehicle interior, and partitioned by a blind, thereby having an effect of providing user convenience.

Furthermore, the roof air conditioner may provide air separately or simultaneously to a first discharge port through which air is supplied to a vehicle passenger compartment and a second discharge port facing the vehicle glass, thereby having an effect of improving economic efficiency.

The present disclosure has been described in detail with reference to various embodiments thereof, and the present disclosure may be used in various other combinations, modifications, and environments. In other words, it should be appreciated by those of ordinary skill in the art that changes may be made to these embodiments without departing from the principles and spirit of the disclosure, the scope of which is defined in the appended claims and equivalents thereto. The embodiments describe modes to implement the technical idea of the present disclosure, and various changes required in specific application fields and uses of the present disclosure are also possible. Accordingly, the detailed description of the present disclosure is not intended to limit the present disclosure to the disclosed embodiments. Additionally, the scope of the appended claims should be construed as including other embodiments as well.

Reference numerals set forth in the Drawings include reference to the following elements as further discussed above:

1: Air conditioner
2: Housing
10: Blower
20: Evaporator
100: First flow path
101: First sub-flow path
102: Second sub-flow path
110: First discharge port
120: Cooling flow path
130: Bypass flow path
140: Temp door
141: First temp door
142: Second temp door
150: Blind
200: Second flow path
210: Second discharge port
300: Heating wire part
400: Switching door

What is claimed is:

1. A roof air conditioner comprising:
a housing;
a blower configured to allow air to be introduced into the housing;
a first flow path configured to allow the air introduced into the housing to be discharged through a first discharge port;
an evaporator located in at least a part of the first flow path;
a second flow path configured to allow the air introduced into the housing to be discharged through a second discharge port branching from the first flow path;
a switching door configured to open and close the first discharge port and the second flow path; and
a temp door,
wherein the first flow path includes
a cooling flow path configured to allow the air to be discharged through the first discharge port via the evaporator, and
a bypass flow path configured to allow the air to be discharged through the first discharge port without passing through the evaporator, and
wherein the temp door is configured to control an opening amount of the cooling flow path and an opening amount of the bypass flow path.

2. The roof air conditioner of claim 1, wherein the switching door is controlled to close the second flow path with the first discharge port in an open state.

3. The roof air conditioner of claim 1, wherein the switching door is controlled to open the second flow path with the first discharge port in a closed state.

4. The roof air conditioner of claim 1, further comprising a heating wire part located in the bypass flow path.

5. The roof air conditioner of claim 1, wherein the temp door is controlled to open the bypass flow path when the cooling flow path is closed.

6. The roof air conditioner of claim 1, wherein the temp door is controlled to close the bypass flow path when the cooling flow path is opened.

7. The roof air conditioner of claim 1, further comprising a blind located in the first flow path and configured to penetrate the evaporator so as to partition the cooling flow path.

8. The roof air conditioner of claim 7, wherein the blind is located across the evaporator so as to partition the cooling flow path into a first sub-flow path and a second sub-flow path.

9. The roof air conditioner of claim 8, wherein:

the temp door comprises a first temp door and a second temp door with the blind centrally located therebetween, the first temp door controls the first sub-flow path and the bypass flow path adjacent to the first sub-flow path and the second temp door controls the second sub-flow path and the bypass flow path adjacent to the second sub-flow path, and an opening amount of the first temp door and an opening amount of the second temp door are independently controlled.

10. The roof air conditioner of claim 8, wherein the switching door includes switching doors respectively located in the first and second discharge ports partitioned by the blind.

11. The roof air conditioner of claim 1, wherein the first discharge port is located corresponding to a passenger compartment of a vehicle and the second discharge port is located adjacent to glass of the vehicle.

* * * * *